US012617729B2

(12) United States Patent
Callaway et al.

(10) Patent No.: US 12,617,729 B2
(45) Date of Patent: May 5, 2026

(54) INTERFACE COATINGS COMPRISING RARE-EARTH SILICATES

(71) Applicant: RTX Corporation, Farmington, CT (US)

(72) Inventors: Evan B. Callaway, Santa Barbara, CA (US); Olivier H. Sudre, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 177 days.

(21) Appl. No.: 18/428,883

(22) Filed: Jan. 31, 2024

(65) Prior Publication Data

US 2025/0243124 A1     Jul. 31, 2025

(51) Int. Cl.
*C04B 35/628* (2006.01)
*C04B 35/80* (2006.01)

(52) U.S. Cl.
CPC ........ *C04B 35/62868* (2013.01); *C04B 35/80* (2013.01); *C04B 2235/3427* (2013.01); *C04B 2235/386* (2013.01); *C04B 2235/5208* (2013.01)

(58) Field of Classification Search
CPC ....... C23C 16/325; C23C 16/342; C09D 5/00; C09D 1/00; C04B 41/85; C04B 41/88; C04B 35/80; C04B 35/52; C04B 35/563; C04B 35/565; C04B 35/573; C04B 35/6286; C04B 35/62883; C04B 35/62868; C04B 35/62871; C04B 35/62894; C04B 35/62897
USPC ......................................................... 428/293
See application file for complete search history.

(56) References Cited

U.S. PATENT DOCUMENTS

| | | | |
|---|---|---|---|
| 5,284,685 A | 2/1994 | Rousseau |
| 2005/0181192 A1 | 8/2005 | Steffier |
| 2016/0049211 A1 | 2/2016 | Feinroth et al. |
| 2016/0159694 A1 | 6/2016 | Chamberlain et al. |
| 2016/0159701 A1 | 6/2016 | Lazur |
| 2019/0322595 A1 | 10/2019 | Magdefrau et al. |
| 2023/0382811 A1 | 11/2023 | Sudre et al. |

FOREIGN PATENT DOCUMENTS

EP          4282846 A1    11/2023

OTHER PUBLICATIONS

Extended European Search Report for EP Application No. 25154538.0, dated Jun. 13, 2025, 8 pages.

*Primary Examiner* — Camie S Thompson
(74) *Attorney, Agent, or Firm* — Kinney & Lange, P.A.

(57) ABSTRACT

A coated fiber structure for use in a ceramic matrix composite includes a fiber and an interface coating system applied to the fiber. The interface coating system includes a first coating layer disposed on the fiber and a second coating layer disposed on the first coating layer. The first coating layer comprises a rare earth nitride or a rare earth carbide. The second coating layer comprises silicon-doped boron nitride.

19 Claims, 1 Drawing Sheet

INTERFACE COATINGS COMPRISING RARE-EARTH SILICATES

BACKGROUND

The present disclosure relates generally to fiber-reinforced ceramic matrix composites (CMCs) and, more particularly, to fiber coating systems.

Fiber-reinforced ceramic matrix composites (CMCs) have been developed for the manufacture of components that are exposed to high temperatures, corrosive environments, and mechanical stress. CMCs are of particular interest in the aerospace industry and their use has been widely adopted for high temperature aircraft applications. While CMCs can provide superior properties, they are susceptible to degradation. Over time, ceramic materials can form microcracks that expose the ceramic material to oxygen or other corrosive elements. To limit damage to fibers or through thickness cracks, fibers can be coated with one or more rigidized interfacial coating (IFC) layers. Interface coatings deposited on fibers of silicon-based CMCs have two primary functions: (1) form a weak bond between the fiber and matrix to promote crack deflection and (2) protect the fiber from external oxidative degradation. Many current IFC systems comprise layers of boron nitride (BN) and silicon-doped BN (SiBN). While providing some protection, current IFCs do not have adequate oxidation resistance or stability at elevated temperatures and are susceptible to degradation over time. These systems promote crack deflection but are susceptible to recession in the presence of water vapor. Environmental barrier coating materials such as mullite and rare earth disilicates provide improved stability in water vapor, making these materials attractive for IFC systems, however, they do not promote crack deflection and current processing routes are challenging in forming thin film layers on fibers for industrial scale CMC manufacture.

New protective materials and coating schemes with greater oxidation resistance and stability at high temperatures and in corrosive environments are desirable to enhance survivability of the CMC components during operation.

SUMMARY

A coated fiber structure for use in a ceramic matrix composite includes a fiber and an interface coating system applied to the fiber. The interface coating system includes a first coating layer disposed on the fiber and a second coating layer disposed on the first coating layer. The first coating layer comprises a rare earth nitride or a rare earth carbide. The second coating layer comprises silicon-doped boron nitride.

A ceramic matrix composite includes a ceramic matrix, a plurality of fibers disposed in the ceramic matrix, and an interface coating system disposed on and in direct contact with the plurality of fibers. The interface coating system includes a first coating layer disposed on the plurality of fibers, a second coating layer disposed on the first coating layer, a third coating layer disposed on the second coating layer, and a fourth coating layer disposed on the third coating layer. The first coating layer comprises a rare earth nitride or a rare earth carbide. The second coating layer comprises silicon-doped boron nitride. The third coating layer comprises a material different from the second coating layer. The fourth coating layer comprises a material different from the third coating layer.

The present summary is provided only by way of example, and not limitation. Other aspects of the present disclosure will be appreciated in view of the entirety of the present disclosure, including the entire text, claims and accompanying figures.

Figure 1:
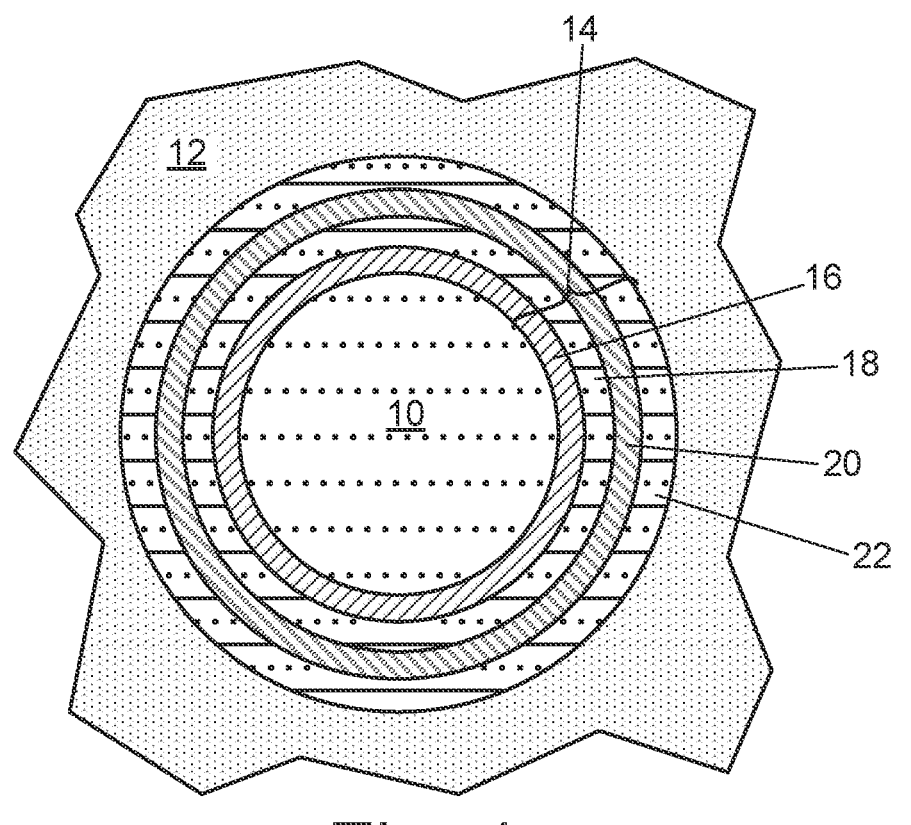
FIG. 1 is a simplified cross-sectional view of a ceramic fiber of a CMC with a multi-layer interface coating system.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

The present disclosure is directed to a multilayer protective structure for a CMC component. More specifically, the present disclosure is directed to a multilayer interface coating that promotes crack deflection, formation of borosilicate glass to seal cracks, and in-situ formation of fiber protecting rare-earth disilicates and/or monosilicates. Rare-earth disilicates and monosilicates are stable compounds capable of limiting oxygen and/or water from reaching fibers. Rare-earth silicate compositions containing boron also have typically a higher transition temperature and higher viscosity than borosilicates alone. Rare-earth disilicates and monosilicates have been developed for use as environmental barrier coatings for components exposed to high temperature and corrosive environments. Traditional environmental barrier coating processes, however, are not suitable for providing thin film rare-earth disilicate and/or monosilicate protective coatings on fibers for industrial scale CMC manufacture. As disclosed herein, thin film protective rare-earth disilicate and/or monosilicate layers can be formed by an internal oxidation process from thin film rare-earth nitride and in combination with silicon-doped boron nitride (SiBN) coating layers. The disclosed IFC system is designed to slow the diffusion of oxygen and other chemicals that could cause degradation through the composite and is intended to prevent oxygen and/or water from reaching fibers. When applied as thin films to fibers of a CMC, the disclosed IFC system can provide sufficient CMC protection while minimizing a contribution to the overall weight of the CMC component.

FIG. 1 is a simplified cross-sectional view of a coated ceramic fiber 10 disposed in a ceramic matrix 12 of a CMC component suitable for use in, for example, a gas turbine engine and, particularly, for use in high temperature and/or corrosive environments (e.g., turbine blades, vanes, seals, and platforms, and combustor panels). Fiber 10 is coated with a multi-layer IFC system 14 configured to protect fiber 10 from mechanical and thermal damage and/or corrosion. IFC system 14 includes innermost layer 16 disposed on fiber 10, first intermediate layer 18 disposed on innermost layer 16, second intermediate layer 20 disposed on first intermediate layer 18, and outermost layer 22 disposed on second intermediate layer 20. Each of innermost layer 16, first and second intermediate layers 18 and 20, and outermost layer 22 can circumscribe fiber 10 and be coaxial with fiber 10 as illustrated in FIG. 1.

Fiber 10 can be formed from silicon carbide (SiC) or other suitable ceramic material. Fiber 10 can be generally cylindrical, formed into bundled fiber tows, and arranged in woven, braided, or non-woven unidirectional or multidirectional architectures. Other fiber materials known in the art for use in various environmental conditions and operating temperatures are contemplated. Fibers 10 can typically make up approximately 20 to 50 percent by volume of the CMC. In some embodiments, IFC system 14 can be applied to encapsulate individual fibers 10. In other embodiments, IFC system 14 can be alternatively or additionally applied to cover or encapsulate fiber tows.

IFC system 14 can be deposited by any suitable means, including chemical vapor deposition and/or chemical vapor infiltration (CVD/CVI). IFC system 14 can be deposited on individual fibers 10 or fiber tows prior to fiber layup. Alternatively, IFC system 14 can be deposited on fibers 10 in a fiber preform of a CMC component or woven or braided fiber sheet. As further described herein, the deposition conditions and/or deposition method can be selected to obtain a desired microstructure and material properties IFC system 14 and, particularly, innermost layer 16.

Innermost layer 16 can be deposited directly on fiber 10 and can generally conform to the outer surface of fiber 10. Innermost layer 16 comprises one or more rare earth elements. Preferable, innermost layer 16 is a rare-earth nitride, however, use of rare-earth carbides is also contemplated. Importantly, innermost layer 16 is a precursor of an oxide and is not an oxide as rare-earth oxides deposited directly on fiber 10 may react with fiber 10 at high temperatures via internal oxidation and lead to increased CMC degradation.

Innermost layer 16 can comprise one or more rare earth elements selected as providing high corrosion resistance when reacted with first intermediate layer 18 in the presence of oxygen to form a rare-earth disilicate ($RE_2Si_2O_7$) and/or rare-earth monosilicate ($RE_2SiO_5$). Preferably, innermost layer 16 comprises at least one of ytterbium, yttrium, erbium, holmium, lutetium, and scandium, which have been identified as providing water vapor corrosion resistance at high temperatures. Multicomponent rare-earth disilicates and/or monosilicates may provide improved material properties, however, single principal rare-earth disilicates and/or monosilicates may be suitable for fiber protection and may be preferred for ease of production. For example, innermost layer 16 can be ytterbium nitride as ytterbium, as a single principle rare-earth disilicate and monosilicate, has been demonstrated to provide high water vapor corrosion resistance.

Innermost layer 16 can have a thickness ranging from about 20 to 200 nm. A thickness of innermost layer 16 can be selected to provide a desired rare earth element concentration for reaction with first intermediate layer 18 while also maintaining a thin film of unreacted innermost layer 16 on fiber 10 to protect fiber 10 from degradation. The thickness of innermost layer 16 may also be dependent on the phase of innermost layer 16. Innermost layer 16 can be deposited as an amorphous phase. In one embodiment, innermost layer 16 can be deposited in a more stable crystalline phase provided surface roughness can be limited being less than the thickness of layer 20. Rougher layers inhibit frictional sliding from occurring by locking up the interface. If increased thickness is desired, it may be preferable to have an innermost layer 16 that is smooth and amorphous (e.g., roughness is equal to approximately 2% of the thickness)

than a crystalline innermost layer 16 if surface roughness cannot easily be controlled in the deposition process (e.g., favoring nucleation over growth to promote small grain size).

First intermediate layer 18 can be deposited directly on innermost layer 16. First intermediate layer 18 can be a conformal coating that substantially circumscribes fiber 10 and innermost layer 16. First intermediate layer 18 is SiBN. First intermediate layer 18 can have a thickness ranging from about 25 to 75 nm. First intermediate layer 18 can have a silicon concentration to provide a ratio of silicon in first intermediate layer 18 to rare earth element in innermost layer 16 of approximately 1:1 as needed for formation of rare-earth disilicates, approximately 1:2 as needed formation of rare-earth monosilicates, or a ratio therebetween to have a targeted ratio of rare-earth disilicates to rare-earth monosilicates. While the amount of silicon available for reaction will impact the distribution of disilicates and monosilicates, the amount of oxygen available and operational temperature are also key factors. Preferably, first intermediate layer 18 can comprise 5 to 30 atomic percent silicon for reaction with innermost layer 16. In some embodiments, first intermediate layer 18 can include a graded silicon content that decreases outward. In the graded structure, the initial deposition of first intermediate layer 18 may exceed 30 atomic percent silicon and may be up to 43 atomic percent silicon (i.e., $Si_3N_4$). Upon oxidation of innermost layer 16, the graded structure reduces the amount of boria in the borosilicate glass at the surface of innermost layer 16.

As discussed further herein, reaction between innermost layer 16 and first intermediate layer 18 can form both rare-earth disilicates and rare-earth monosilicates. Rare-earth monosilicates exhibit improved chemical stability at higher temperatures than their disilicate counterparts; while rare-earth disilicates have a coefficient of thermal expansion similar to fibers 10 formed of SiC. Rare-earth disilicates may be preferred to minimize interlayer thermal stress and cracking, however, both rare-earth disilicates and rare-earth monosilicates are beneficial and provide superior fiber protection over current IFC systems.

Second intermediate layer 20 can be deposited directly on first intermediate layer 18. Second intermediate layer 20 can be a conformal coating that substantially circumscribes fiber 10, innermost layer 16, and first intermediate layer 18. Second intermediate layer 20 is boron nitride (BN). Second intermediate layer 20 is a weak, debonding layer configured to arrest and deflect cracks propagating through matrix 12 to prevent fibers 10 breakage. In some embodiments, second intermediate layer 20 can be deposited to include an anisotropic region characterized by a more crystalline three-dimensional structure of hexagonal boron nitride (h-BN), which can provide improved oxidation resistance and/or toughness. Second intermediate layer 20 can have a thickness ranging from about 20 to 200 nm.

Outermost layer 22 can be deposited directly on second intermediate layer 20. Outermost layer 22 can be a conformal coating that substantially circumscribes fiber 10, innermost layer 16, first intermediate layer 18, and second intermediate layer 20. Outermost layer 22 is SiBN, which provides improved oxidation resistance over conventional BN coatings. Outermost layer 22 can have a thickness ranging from 50 to 200 nm. Outermost layer 22 can comprise a relatively low amount of silicon so that outermost layer 22 readily oxidizes when exposed to oxygen to form a borosilicate glass. For example, outermost layer 22 can comprise approximately 5 to 15 atomic percent silicon.

In some embodiments, IFC system 14 can include one or more additional layers protective against oxidation (e.g., $B_4C$, SiBC) and/or useful for other densification processes (e.g., melt infiltration).

Matrix 12 can be directly deposited on outermost layer 22 or an additional layer provided thereon. Matrix 12 can be SiC or other suitable ceramic material. Matrix 12 can include additives as known in the art to achieve desired material properties. Matrix 12 surrounds fibers 10 and IFC system 14 with IFC system 14 disposed radially between fiber 10 and matrix 12.

Figure 2:
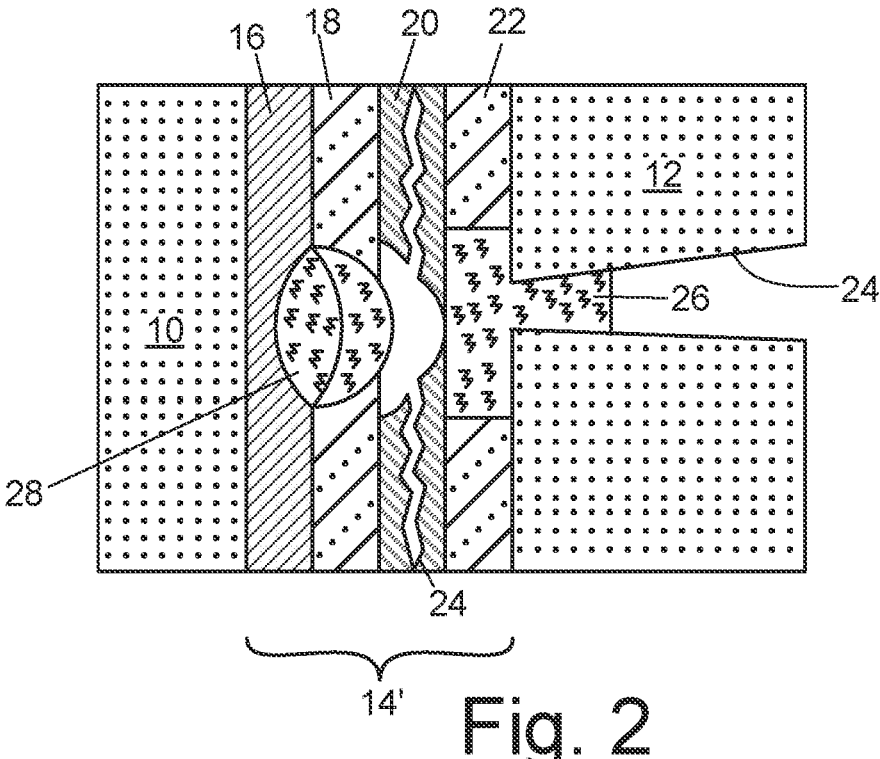
FIG. 2 is a simplified cross-sectional view of a ceramic fiber of a CMC with a modified multi-layer interface coating system.

In operation, a fiber-reinforced CMC component including IFC system 14 is susceptible to cracks in matrix 12. FIG. 2 is a simplified cross-sectional view of fiber 10 of a CMC component with a modified multi-layer interface coating system 14' following crack formation and exposure to water vapor. FIG. 2 shows fiber 10; matrix 12; crack 24; and modified IFC system 14', including innermost layer 16, first intermediate layer 18, second intermediate layer 20, outermost layer 22, glass seal 26, and rare-earth silicate layer 28.

Cracks 24 that form in matrix 12 can penetrate through outermost layer 22 of IFC system 14 and deflect along second intermediate layer 20. Oxygen and water vapor entering crack 24 begin to oxidize the exposed SiBN of outermost layer 22 and first intermediate layer 18 and the BN of second intermediate layer 20. The SiBN of first intermediate layer 18 oxidizes and reacts with the rare-earth nitride of innermost layer 16 to form a compound with a composition evolving towards the protective rare-earth silicate layer 28. The reaction product of oxidation of innermost layer 16 and first intermediate layer 18 and, more generally, of the interfacial region therebetween, is complex and can evolve over time. The reaction product can be crystalline or amorphous/glassy and may vary locally. Boron contained therein is a fluxing agent for glasses and is expected to lower the viscosity of the reaction product. The composition will evolve with time as boron diffuses out of the region and evaporates making the region richer in rare earth elements and silica, increasing the viscosity of the composition and likely forming crystalline phases including rare-earth silicates. Rare earth silicate layer 28 can include rare-earth disilicates and/or rare-earth monosilicates.

The SiBN of outermost layer 22 oxidizes to form a silica glass seal 26 (i.e., borosilicate glass) that expands and seals crack 24 in matrix 12. The BN of second intermediate layer 20 is partially oxidized but is protected from further oxidation once crack 24 is sealed.

Rare-earth disilicate and/or monosilicate layer 28 can span a partial or full thickness of each of innermost layer 16 and first intermediate layer 18. Preferably, a thin film of innermost layer 16 remains to separate rare-earth disilicate and/or monosilicate layer 28 from fiber 10 to prevent rare-earth disilicate and/or monosilicate layer 28 from reacting with fiber 10. Rare-earth disilicate and/or monosilicate layer 28 can be localized to a region of crack 24. Rare-earth disilicate and/or monosilicate layer 28 can partially circumscribe fiber 10 and can extend a partial length of fiber 10. In this manner, rare-earth disilicate and/or monosilicate layer 28 can provide localized or direct protection of fiber 10 in the region of crack 24. Eventually, the boron in the borosilicate glass can evaporate leaving silica-rich glass, which can react with the rare-earth nitride of the innermost layer 16. Again, innermost layer 16 can be deposited with a suitable thickness to ensure that a thin film of innermost layer 16 directly coats fiber 10.

IFC system 14 can be deposited on fiber 10 using CVD/CVI. In some embodiments, fiber tows or woven or braided fiber sheets can be coated with IFC system 14 by CVD. Alternatively, fibers 10 can be laid up in a CMC preform and coated by CVI. Coating of individual fiber tows can be conducted at higher temperatures (i.e., typically above 1200° C. and, preferably, 1400° C. depending on fiber stability) allowing for crystalline growth in innermost layer 16. CVI of a fiber preform can be performed at a temperature that can range, for example, from approximately 800° C. to 1200° C., and pressure ranging between 1 and 50 Torr. CVI conditions for deposition on a fiber preform will generally produce an amorphous innermost layer 16.

In some embodiments, fibers 10 having IFC system 14 can be arranged, for example, as fabric plies, braids, or tapes, in a layered stacking arrangement or can be three-dimensionally woven to form a fiber preform of a component. In other embodiments, fibers 10 having a portion of IFC system 14, for example, innermost layer 16, can be arranged to form a fiber preform or fiber sheet and further layers of IFC system 14 can be applied to fibers 10 of the preform or fiber sheet via CVD/CVI. Partial deposition of IFC system 14 prior to fiber layup may be desirable for some fiber layup process, particularly fiber weaving, which may be difficult for fibers coated with full thickness IFC system 14.

Each layer of IFC system 14 can be applied in successive rounds of CVD/CVI starting from innermost layer 16 and working outward to outermost layer 22. A chlorinator can be included as part of the CVD/CVI gas supply to introduce chloride precursors of the rare earth element(s) of innermost layer 16 (e.g., $YbCl_3$). Alternatively, chlorides of the rare-earth can be sublimated or evaporated directly. Other more complex precursors of rare-earth are also be envisioned (e.g., ketonates, amidanates). The chloride precursor can be reacted with a combination of ammonia ($NH_3$) or nitrogen ($N_2$) and hydrogen ($H_2$) to remove chlorine (as HCl) and form the rare-earth nitride of innermost layer 16. First intermediate layer 18, second intermediate layer 20, and outermost layer 22 can be formed from boron, nitrogen, and silicon precursor gases as known in the art. Carrier gases can include, for example, hydrogen, nitrogen, and argon.

Once IFC system 14 has been applied to fibers 10 and fibers 10 are arranged in a preform of a CMC component, matrix 12 can be deposited for densification. Densification can be achieved using CVI, polymer infiltration and pyrolysis, slurry infiltration, melt infiltration, and combinations thereof as known in the art. Densification can be carried out until the resulting CMC has reached the desired residual porosity.

Various optional post-processing steps (not shown) can be performed, such as the application of one or more protective coatings (e.g., environmental and/or thermal barrier coatings). A bond coat can also be applied to facilitate bonding between the CMC and a protective coating. Other protective coatings, especially those suitable for use in a gas turbine engine environment, are contemplated.

The disclosed IFC system 14 and in-situ modified IFC system 14' can slow the diffusion of oxygen and other chemicals that could cause degradation through the composite and prevent oxygen and/or water from reaching fibers 10.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

The embodiments disclosed herein are intended to provide an explanation of the present invention and not a limitation of the invention. The present invention is not limited to the embodiments disclosed. It will be understood by one skilled in the art that various modifications and variations can be made to the invention without departing from the scope and spirit of the invention.

Discussion of Possible Embodiments

The following are non-exclusive descriptions of possible embodiments of the present invention.

A coated fiber structure for use in a ceramic matrix composite includes a fiber and an interface coating system applied to the fiber. The interface coating system includes a first coating layer disposed on the fiber and a second coating layer disposed on the first coating layer. The first coating layer comprises a rare earth nitride or a rare earth carbide. The second coating layer comprises silicon-doped boron nitride.

The coated fiber structure of the preceding paragraph can optionally include, additionally and/or alternatively, any one or more of the following features, configurations and/or additional components:

In an embodiment of the preceding coated fiber structure, the first coating layer can comprise a rare-earth nitride.

In an embodiment of any of the preceding coated fiber structures, the first coating layer can have a thickness ranging from 50 to 200 nm.

In an embodiment of any of the preceding coated fiber structures, the second coating layer can have a thickness ranging from 25 to 75 nm.

In an embodiment of any of the preceding coated fiber structures, a ratio of silicon to rare earth element in the first and second coating layers can be within a range of approximately 1:1 and 1:2.

In an embodiment of any of the preceding coated fiber structures, the second coating layer can comprise 5-30 atomic percent silicon.

An embodiment of any of the preceding coated fiber structures can further include a third coating layer disposed on and in direct contact with the second coating layer, the third coating layer comprising boron nitride.

An embodiment of any of the preceding coated fiber structures can further include a fourth coating layer disposed on and in direct contact with the third coating layer, the fourth coating layer comprising silicon-doped boron nitride.

In an embodiment of any of the preceding coated fiber structures, the fourth coating layer can comprise 5-15 atomic percent silicon.

In an embodiment of any of the preceding coated fiber structures, the first coating layer can be amorphous.

In an embodiment of any of the preceding coated fiber structures, the first coating layer can be crystalline.

In an embodiment of any of the preceding coated fiber structures, the first coating layer can be ytterbium nitride.

An embodiment of any of the preceding coated fiber structures can further include a fifth coating layer disposed between and in direct contact with each of the first coating layer and the second coating layer, the fifth coating layer comprising at least one of a rare earth disilicate and a rare earth monosilicate.

A ceramic matrix composite includes a ceramic matrix, a plurality of fibers disposed in the ceramic matrix, and an interface coating system disposed on and in direct contact with the plurality of fibers. The interface coating system includes a first coating layer disposed on the plurality of fibers, a second coating layer disposed on the first coating layer, a third coating layer disposed on the second coating layer, and a fourth coating layer disposed on the third coating layer. The first coating layer comprises a rare earth nitride or a rare earth carbide. The second coating layer comprises silicon-doped boron nitride. The third coating layer comprises a material different from the second coating layer. The fourth coating layer comprises a material different from the third coating layer.

The ceramic matrix composite of the preceding paragraph can optionally include, additionally and/or alternatively, any one or more of the following features, configurations and/or additional components:

In an embodiment of the preceding ceramic matrix composite, the third coating layer can comprise boron nitride and the fourth coating layer can comprise silicon-doped boron nitride.

An embodiment of the preceding ceramic matrix composite can further include a fifth coating layer disposed between and in direct contact with each of the first coating layer and the second coating layer. The fifth coating layer can comprise at least one of a rare earth disilicate and a rare earth monosilicate.

In an embodiment of the preceding ceramic matrix composite, a ratio of silicon to rare earth element in the first and second coating layers can be between approximately 1:1 and 1:2.

In an embodiment of the preceding ceramic matrix composite, the second coating layer can comprise 5-30 atomic percent silicon.

In an embodiment of the preceding ceramic matrix composite, the fourth coating layer can comprise 5-15 atomic percent silicon.

In an embodiment of the preceding ceramic matrix composite, the first coating layer can comprise ytterbium nitride.

The invention claimed is:

1. A coated fiber structure for use in a ceramic matrix composite, the coated fiber structure comprising:
   a fiber; and
   an interface coating system applied to the fiber, the interface coating system comprising:
      a first coating layer disposed on the fiber, the first coating layer comprising a rare earth nitride; and a second coating layer disposed on the first coating layer, the second coating layer comprising silicon-doped boron nitride.

2. The coated fiber structure of claim 1, wherein the first coating layer has a thickness ranging from 50 to 200 nm.

3. The coated fiber structure of claim 2, wherein the second coating layer has a thickness ranging from 25 to 75 nm.

4. The coated fiber structure of claim 1, wherein a ratio of silicon in the second coating layer to rare earth element in the first coating layer is within a range of approximately 1:1 and 1:2.

5. The coated fiber structure of claim 1, wherein the second coating layer comprises 5-30 atomic percent silicon.

6. The coated fiber structure of claim 1, and further comprising a third coating layer disposed on and in direct contact with the second coating layer, the third coating layer comprising boron nitride.

7. The coated fiber structure of claim 6, and further comprising a fourth coating layer disposed on and in direct contact with the third coating layer, the fourth coating layer comprising silicon-doped boron nitride.

8. The coated fiber structure of claim 7, wherein the fourth coating layer comprises 5-15 atomic percent silicon.

9. The coated fiber structure of claim 1, wherein the first coating layer is amorphous.

10. The coated fiber structure of claim 1, wherein the first coating layer is crystalline.

11. The coated fiber structure of claim 1, wherein the first coating layer is ytterbium nitride.

12. The coated fiber structure of claim 1, and further comprising a fifth coating layer disposed between and in direct contact with each of the first coating layer and the second coating layer, the fifth coating layer comprising at least one of a rare earth disilicate and a rare earth mono-silicate.

13. A ceramic matrix composite comprising:
a ceramic matrix;

a plurality of fibers disposed in the ceramic matrix; and
an interface coating system disposed on and in direct contact with the plurality of fibers, the interface coating system comprising:
a first coating layer disposed on the plurality of fibers, the first coating layer comprising a rare earth nitride or a rare earth carbide;
a second coating layer disposed on the first coating layer, the second coating layer comprising silicon-doped boron nitride;
a third coating layer disposed on the second coating layer, the third coating layer comprising a material different from the second coating layer; and
a fourth coating layer disposed on the third coating layer, the fourth coating layer comprising a material different from the third coating layer.

14. The ceramic matrix composite of claim 13, wherein the third coating layer comprises boron nitride and the fourth coating layer comprises silicon-doped boron nitride.

15. The ceramic matrix composite of claim 14, and further comprising a fifth coating layer disposed between and in direct contact with each of the first coating layer and the second coating layer, the fifth coating layer comprising at least one of a rare earth disilicate and a rare earth mono-silicate.

16. The ceramic matrix composite of claim 14, wherein a ratio of silicon in the second coating layer to rare earth element in the first coating layer is between approximately 1:1 and 1:2.

17. The ceramic matrix composite of claim 14, wherein the second coating layer comprises 5-30 atomic percent silicon.

18. The ceramic matrix composite of claim 14, wherein the fourth coating layer comprises 5-15 atomic percent silicon.

19. The ceramic matrix composite of claim 14, wherein the first coating layer comprises ytterbium nitride.

* * * * *